US010782190B1

(12) United States Patent
Gregory et al.

(10) Patent No.: US 10,782,190 B1
(45) Date of Patent: Sep. 22, 2020

(54) RESISTANCE TEMPERATURE DETECTOR (RTD) FOR CERAMIC MATRIX COMPOSITES

(71) Applicant: University of Rhode Island Board of Trustees, Kingston, RI (US)

(72) Inventors: Otto J. Gregory, Narragansett, RI (US); Kevin Rivera, Providence, RI (US); Matthew Thomas Ricci, Greenwich, RI (US)

(73) Assignee: University of Rhode Island Board of Trustees, Kingston, RI (US)

( * ) Notice: Subject to any disclaimer, the term of this patent is extended or adjusted under 35 U.S.C. 154(b) by 0 days.

(21) Appl. No.: 16/221,270

(22) Filed: Dec. 14, 2018

Related U.S. Application Data

(60) Provisional application No. 62/719,337, filed on Aug. 17, 2018, provisional application No. 62/598,893, filed on Dec. 14, 2017.

(51) Int. Cl.
*G01K 7/22* (2006.01)
*C04B 35/83* (2006.01)
(Continued)

(52) U.S. Cl.
CPC .......... *G01K 7/226* (2013.01); *C04B 35/806* (2013.01); *C04B 35/83* (2013.01);
(Continued)

(58) Field of Classification Search
CPC .......... G01K 7/226; G01K 7/027; G01K 7/08; C04B 35/806; C04B 35/83; C04B 41/4515
See application file for complete search history.

(56) References Cited

U.S. PATENT DOCUMENTS 3,007,989 A 11/1961 Nicholson et al.
4,056,395 A 11/1977 Sato et al.
(Continued)

OTHER PUBLICATIONS

"Revised Thermocouple Reference Tables: Type S, Omega Engineering, Stanford, CT", http://www.omega.com:80/temperature/Z/pdf/z208-209.pdf, 2001.
(Continued)

*Primary Examiner* — Kyung S Lee
(74) *Attorney, Agent, or Firm* — Peacock Law P.C.; Philip D. Askenazy

(57) ABSTRACT

A resistance temperature detector (RTD) that uses a ceramic matrix composite (CMC), such as a silicon carbide fiber-reinforced silicon carbide matrix, as an active temperature sensing element, which can operate at temperatures greater than 1000° C. or even 1600° C. Conductive indium tin oxide or a single elemental metal such as platinum is deposited on a dielectric or insulating layer such as mullite or an environmental barrier coating (EBC) on the substrate. Openings in the layer allow etching of the CMC surface in order to make high quality ohmic contacts with the conductive material, either directly or through a silicide diffusion barrier such as ITO. The RTD can measure both temperature and strain of the CMC. The use of an EBC, which typically is deposited on the CMC by the manufacturer, as the insulating or dielectric layer can be extended to other devices such as strain gages and thermocouples that use the CMC as a sensing element. The EBC can be masked and etched to form the openings. A conductive EBC can be used as the silicide diffusion barrier.

29 Claims, 8 Drawing Sheets

(51) Int. Cl.

| | |
|---|---|
| *G01K 7/08* | (2006.01) |
| *G01K 7/02* | (2006.01) |
| *C04B 41/91* | (2006.01) |
| *C04B 41/45* | (2006.01) |
| *C04B 41/50* | (2006.01) |
| *C04B 35/80* | (2006.01) |

(52) U.S. Cl.
CPC ...... *C04B 41/4515* (2013.01); *C04B 41/4592* (2013.01); *C04B 41/505* (2013.01); *C04B 41/5062* (2013.01); *C04B 41/91* (2013.01); *G01K 7/028* (2013.01); *G01K 7/08* (2013.01); *C04B 2235/386* (2013.01); *C04B 2235/3826* (2013.01); *C04B 2235/422* (2013.01); *C04B 2235/5244* (2013.01); *C04B 2235/5248* (2013.01); *C04B 2235/5268* (2013.01)

(56) References Cited

U.S. PATENT DOCUMENTS

| | | | | |
|---|---|---|---|---|
| 4,225,569 | A | * | 9/1980 | Matsui ............... C04B 35/524 264/29.1 |
| 4,450,314 | A | | 5/1984 | Huther |
| 4,663,205 | A | | 5/1987 | Hayashi et al. |
| 4,907,052 | A | | 3/1990 | Takada et al. |
| 4,935,345 | A | * | 6/1990 | Guilbeau ............ A61B 5/14865 435/14 |
| 5,474,618 | A | | 12/1995 | Allaire |
| 5,523,957 | A | | 6/1996 | Perron et al. |
| 5,804,277 | A | | 9/1998 | Ashbee |
| 5,867,886 | A | * | 2/1999 | Ratell ................ G01L 9/0055 29/595 |
| 6,299,988 | B1 | * | 10/2001 | Wang ................ C04B 35/573 428/632 |
| 6,325,608 | B1 | * | 12/2001 | Shivakumar ........... C04B 35/83 264/29.5 |
| 6,341,892 | B1 | | 1/2002 | Schmermund |
| 6,437,681 | B1 | * | 8/2002 | Wang ................ G01K 7/183 338/25 |
| 6,729,187 | B1 | | 5/2004 | Gregory |
| 7,498,066 | B2 | | 3/2009 | Kumar et al. |
| 7,687,016 | B1 | | 3/2010 | DiCarlo et al. |
| 7,741,834 | B2 | | 6/2010 | Dang |
| 7,849,752 | B2 | | 12/2010 | Gregor et al. |
| 3,052,324 | A1 | | 11/2011 | Gregory et al. |
| 8,132,467 | B2 | | 3/2012 | Shinde et al. |
| 8,191,426 | B2 | | 6/2012 | Gregory et al. |
| 8,894,918 | B2 | | 11/2014 | DiCarlo et al. |
| 9,250,148 | B2 | * | 2/2016 | Manohara ............ G01L 9/12 |
| 10,161,807 | B2 | | 12/2018 | Shi et al. |
| 2004/0080394 | A1 | * | 4/2004 | Nelson ............... G01K 7/223 338/28 |
| 2004/0157338 | A1 | * | 8/2004 | Burke ............... G01N 27/3274 436/147 |
| 2004/0202886 | A1 | | 10/2004 | Subramanian |
| 2005/0115329 | A1 | * | 6/2005 | Gregory ............ G01M 5/0083 73/777 |
| 2005/0147877 | A1 | | 7/2005 | Tarnowski et al. |
| 2005/0198967 | A1 | | 9/2005 | Subramanian |
| 2006/0288794 | A1 | | 12/2006 | Hardwicke et al. |
| 2007/0029303 | A1 | | 2/2007 | Bowen |
| 2007/0056624 | A1 | | 3/2007 | Gregory et al. |
| 2008/0025366 | A1 | | 1/2008 | McBurney |
| 2008/0223504 | A1 | | 9/2008 | Ohno |
| 2008/0230904 | A1 | | 9/2008 | Lee |
| 2008/0264175 | A1 | | 10/2008 | Leman et al. |
| 2009/0039911 | A1 | | 2/2009 | Dang |
| 2009/0078561 | A1 | | 3/2009 | Teo et al. |
| 2009/0121896 | A1 | | 5/2009 | Mitchell |
| 2009/0290614 | A1 | | 11/2009 | Gregory et al. |
| 2010/0109209 | A1 | | 5/2010 | Pasquere |
| 2010/0117859 | A1 | | 5/2010 | Mitchell |
| 2010/0226756 | A1 | | 9/2010 | Mitchell et al. |
| 2010/0319436 | A1 | | 12/2010 | Sun et al. |
| 2011/0222582 | A1 | | 9/2011 | Subramanian et al. |
| 2011/0280279 | A1 | | 11/2011 | Gregory et al. |
| 2011/0299562 | A1 | | 12/2011 | Hashemian |
| 2013/0020670 | A1 | | 1/2013 | Hori et al. |
| 2013/0125386 | A1 | | 5/2013 | Gregory et al. |
| 2013/0298648 | A1 | | 11/2013 | Sun et al. |
| 2014/0058166 | A1 | | 2/2014 | Bedard et al. |
| 2014/0083848 | A1 | * | 3/2014 | Sun .................. A61B 5/01 204/400 |
| 2014/0346502 | A1 | | 11/2014 | Matsukizono |
| 2015/0364667 | A1 | | 12/2015 | Jarmon |
| 2016/0153842 | A1 | | 6/2016 | Cheverton et al. |
| 2016/0169749 | A1 | | 6/2016 | Glasheen et al. |
| 2016/0305271 | A1 | | 10/2016 | Schmidt et al. |
| 2017/0008125 | A1 | | 1/2017 | Bruck et al. |
| 2017/0234739 | A1 | | 8/2017 | Gregory et al. |
| 2017/0373612 | A1 | | 12/2017 | Sellinger et al. |
| 2018/0003576 | A1 | * | 1/2018 | Gregory ............... G01L 1/2293 |

OTHER PUBLICATIONS

Ahmed, M. G., et al., "Comparison of Argon Triple Point between NIS-Egypt and LNE-INM/CNAM/France", Journal of Metrology Society of India, vol. 23, No. 1, 2008, 3-9.

Aniolek, Gregg E., et al., "Thin film thermocouples for advanced ceramic gas turbine engines", Surface and Coatings Technology, vol. 28/29, Elsevier Science, S.A., 1994, 70-75.

Chaston, J. C., "The Oxidation of the Platinum Metals", Platinum Metals Review, vol. 19, No. 4, 1975, 135-140.

Chen, Ximing , et al., "Thin-Film Thermocouples Based onthe System In2O3—SnO2", J. Am. Ceram. So., vol. 94, No. 3, The American Ceramic Society, 2011, 854-860.

Chou, T. C., "Anomalous solid state reaction between SiC and Pt", J. Mater. Res., vol. 5, No. 3, Materials Research Society, Mar. 1990, 601-608.

Chou, T. C., "High temperature reactions between SiC and platinum", Journal of Materials Science, vol. 26, 1991, 1412-1420.

Gegner, J. , et al., "Diffusivity and solubility of oxygen in solid palladium", J Mater Sci, vol. 44, Springer Science+Business Media, LLC, 2009, 2198-2205.

Imran, Muhammad , et al., "Effect of Thin Film Thicknesses and Materials on Response of RTDs and Microthermocouples", IEEE Sensors Journal, vol. 6, No. 6, IEEE, Dec. 2006, 1459-1467.

Kreider, Kenneth G., et al., "High temperature materials for thin-film thermocouples on silicon wafers", Thin Sold Films, vol. 376, Elsevier Science S.A., 2000, 32-37.

Naslain, Roger R., "SiC-Matrix Composites: Nonbrittle Ceramics for Thermo-Structural Application", International Journal of Applied Ceramic Technology, vol. 2, No. 2, 2005, 75-84.

Rijinders, M. R., et al., "Pattern formation in Pt-Sic diffusion couples", Solid State Ionics, vol. 95, Elsevier Science B.V., 1997, 51-59.

Rivera, Kevin , et al., "Advanced Sensors for CMC Gas Turbine Engine Components", ICACC 2017 Proceedings, May 31, 2018, 1-4.

Rivera, Kevin , et al., "Diffusion barrier coatings for CMC thermocouples", Surface & Coatings Technology, vol. 336, Elsevier B.V., Feb. 25, 2018, 17-21.

Rivera, K. , et al., "Embedded Thermocouples for CMC Engine Components", IEEE Sensors, 2017.

Rivera, Kevin , et al., "Novel temperature sensors for CMC engine components", Journal of Materials Research, vol. 32, No. 17, Materials Research Society, Sep. 14, 2017, 3319-3325.

Rivera, Kevin , et al., "Strain Gages for SIC-CiC Ceramic Matrix Composite Engine Components", IEEE Sensors Letters, vol. 2, No. 3, IEEE, Sep. 2018.

Smith, Craig E., et al., "Electrical Resistance as a Nondestructive Evaluation Technique for SiC/SiC Ceramic Matrix Composites Under Creep-Rupture Loading", International Journal of Applied Ceramic Technology, vol. 8, No. 2, The American Ceramic Society, 2011, 298-307.

(56) References Cited

OTHER PUBLICATIONS

Tougas, Ian M., "Metallic and Ceramic Thin Film Thermocouples", Open Access Master's Theses, Paper 7, http://digitalcommons.uri.edu/theses/7, 2013.

Tougas, Ian M., et al., "Metallic and Cermic Thin Film Thermocouples for Gas Turbine Engines", Sensors, vol. 13, Nov. 8, 2013, 15324-15347.

Tougas, Ian M., et al., "Thin film platinum-palladium thermocouples for gas turbine engine application", Thin Solid Films, vol. 539, Elsevier B.V., 2013, 345-349.

Wang, C. C., et al., "High-Temperature thermistors based on yttria and calcium zirconate", Sensors and Actuators A, vol. 58, Elsevier Science S.A., 1997, 237-243.

Wrbanek, John D., et al., "Ceramic thin film thermocouples for SiC-based ceramic matrix composites", Thin Solid Films, doi:10.1016/j.tsf.2012.04.034, 2012.

Yu, Z., et al., "NiAl bond coats made by a directed vapor deposition approach", Materials Science and Engineering A, vol. 394, Elsevier B.V., 2005, 43-52.

Zhang, Jingchun, et al., "Electrical, mechanical and metal contact properties of polycrystalline 3C-SiC films for MEMS in harsh environments", Surface & Coatings Technology, vol. 201, Elsevier B.V., 2007, 8893-8898.

\* cited by examiner

RESISTANCE TEMPERATURE DETECTOR (RTD) FOR CERAMIC MATRIX COMPOSITES

CROSS-REFERENCE TO RELATED APPLICATIONS

This application claims priority to and the benefit of the filing of U.S. Provisional Patent Application Ser. No. 62/719,337, entitled "Resistive Temperature Device (RTD) for Ceramic Matrix Composites and Methods of Preparation Thereof", filed on Aug. 17, 2018, and U.S. Provisional Patent Application Ser. No. 62/598,893, entitled "Resistive Temperature Device (RTD) for Ceramic Matrix Composites and Methods of Preparation Thereof", filed on Dec. 14, 2017. The specifications and claims thereof, and appendices and attachments thereto, are incorporated herein by reference.

BACKGROUND OF THE INVENTION

Field of the Invention (Technical Field)

The present invention is related to a resistance temperature detector (RTD) that utilizes a ceramic matrix composite (CMC) itself as the active sensor element.

Background Art

Note that the following discussion may refer to a number of publications and references.
Discussion of such publications herein is given for more complete background of the scientific principles and is not to be construed as an admission that such publications are prior art for patentability determination purposes.

Next generation gas turbine engines will employ advanced materials that are specifically designed to handle the harsh environment inside the hot section of an engine. Recently there has been interest in using ceramic-based materials, such as silicon-carbide fiber-reinforced silicon-carbide (SiC/SiC) or carbon fiber-reinforced carbon (C/C) ceramic matrix composites to replace superalloy-based engine components in the hot sections of gas turbine engines. Engine components based on CMCs are lighter and have superior thermo-mechanical properties compared to nickel-based superalloys, so they can operate at higher temperatures, which enables greater overall efficiencies. Advanced instrumentation must not only survive the rotational forces and high temperatures in these environments but must also be capable of accurately monitoring the temperature and strain of CMC engine components. Given the harsh conditions inside the gas turbine engine, it is becoming increasingly more difficult to instrument these CMC engine components to monitor structural integrity for extended periods of time, without adversely affecting operation of the engine. Thus, there is a need to develop instrumentation that can survive the higher operating temperatures associated with these advanced engine designs and monitor the engine conditions, such as temperature, during operation. A resistance temperature detector (RTD) is a resistive device that measures the electrical resistance of a component and relates this resistance to temperature.

Thin film instrumentation has been considered for CMC engine components, but there are several challenges associated with CMC's, namely surface roughness due to the SiC fiber weaves. Typical thin film sensors are deposited directly onto the surface of a component so that a true surface measurement is possible. In this way, thin film instrumentation becomes an integral part of the surface of a component. Thin films sensors have several advantages. They do not interfere with gas flow paths through the engine because they have a low profile; i.e. they have thicknesses on the order of micrometers, which is well below the boundary layer thickness. Thin film sensors have extremely small masses (on the order of $10^{-6}$ g). With a minimal mass, this means that thin film sensors will not alter the vibrational modes of, for example, blades comprising a turbine. It also translates into faster response times and eliminates the need for adhesives. However, thin film sensors also have some disadvantages including relatively small diffusion distances, which can lead to decreased stability issues at elevated temperature.

SUMMARY OF THE INVENTION
(DISCLOSURE OF THE INVENTION)

An embodiment of the present invention is a resistance temperature detector (RTD) comprising an active temperature sensing element comprising a ceramic matrix composite (CMC) substrate. The RTD is preferably capable of obtaining temperature measurements at temperatures greater than 1000° C., and more preferably greater than 1600° C. The RTD preferably further comprises a conductive material, which optionally comprises indium tin oxide or a single elemental metal, preferably platinum. A portion of the conductive material is preferably deposited on a layer selected from the group consisting of a dielectric layer, an insulating layer, a planarizing layer, and an environmental barrier coating (EBC), the layer disposed on the CMC substrate. The layer preferably comprises mullite. The conductive material preferably electrically contacts the CMC substrate through openings in the layer. A surface of the CMC substrate in the openings is preferably etched using a buffered hydrofluoric acid solution. The RTD preferably comprises an oxygen diffusion barrier deposited on the conductive material in a vicinity of the openings. The oxygen diffusion barrier preferably comprises indium oxynitride or indium-tin-oxynitride. The RTD preferably comprises a silicide diffusion barrier between the conductive material and the CMC substrate. The silicide diffusion barrier preferably comprises indium tin oxide, a tungsten: ITO nanocomposite, or an indium tungsten composite. The conductive material and/or the layer is optionally deposited as a paste, ink, spray, or cement, preferably without the use of a vacuum chamber. Damage to the conductive material and/or the layer is preferably reparable by depositing paste, ink, spray, or cement in situ. The conductive material and/or the layer is optionally deposited and patterned using vacuum sputtering and/or photolithography. The CMC substrate preferably comprises a silicon carbide fiber-reinforced silicon carbide matrix, a carbon fiber-reinforced carbon matrix, or a boron nitride fiber-reinforced boron nitride matrix. The RTD preferably comprises a four wire configuration. The CMC substrate is preferably an engine component. The magnitude of thermoelectric power produced by the RTD preferably depends on a fiber orientation of the CMC substrate. The orientation of the RTD relative to the fiber orientation is preferably chosen to maximize the thermoelectric power. The RTD preferably comprises one or more legs in series with the CMC substrate, the legs comprising a conductive oxide which preferably has on opposite semiconductor than that of the CMC substrate. The RTD is optionally capable of measuring both temperature and strain of the CMC substrate, and preferably comprises a separate strain gage oriented at 90° relative to an orientation of the strain sensing elements of the RTD.

Another embodiment of the present invention is a sensing device comprising an active sensing element comprising a ceramic matrix composite (CMC) substrate, the device comprising an environmental barrier coating (EBC) disposed on the CMC substrate and a conductive material. The device preferably comprises a strain gage, a thermocouple, a surface temperature sensor, a thermal gradient sensor, an RTD, or a combination thereof. The EBC was preferably disposed on the CMC substrate by the manufacturer of the CMC substrate. The EBC preferably comprises openings through which the conductive material electrically contacts the CMC substrate. The openings are preferably produced by masking and etching the EBC. Areas of the EBC preferably electrically insulate the CMC substrate from the conductive material. Optionally the EBC is conductive and areas of the EBC form a silicide diffusion barrier between the conductive material and the CMC substrate.

Another embodiment of the present invention is a method of manufacturing a sensing device, the method comprising providing a ceramic matrix composite (CMC) substrate coated with an environmental barrier coating (EBC); masking selected areas of the EBC; removing unmasked areas of the EBC to form openings in the EBC; removing a mask from the selected areas of the EBC; and depositing a conductive material; wherein the CMC substrate is an active sensing element of the sensing device. The masked areas of the EBC preferably electrically insulate the CMC substrate from the conductive material. Depositing the conductive material optionally comprises depositing the conductive material on the CMC substrate through the openings. The method preferably comprises depositing a silicide diffusion barrier on the CMC substrate through the openings, in which case depositing the conductive material preferably comprises depositing the conductive material on the silicide diffusion barrier through the openings. The method optionally comprises depositing a dielectric or insulating layer in the openings, wherein the openings are large enough so that the selected areas of the EBC form isolated islands, in which case depositing the conductive material preferably comprises depositing the conductive material on the selected areas of the EBC. The method preferably comprises etching the surface of the CMC substrate through the openings prior to depositing the conductive material, the etching step preferably comprising using a buffered hydrofluoric acid solution.

Objects, advantages and novel features, and further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated into and form a part of the specification, illustrate the practice of embodiments of the present invention and, together with the description, serve to explain the principles of the invention. The drawings are only for the purpose of illustrating certain embodiments of the invention and are not to be construed as limiting the invention. In the figures.

DETAILED DESCRIPTION OF EMBODIMENTS OF THE INVENTION

Figure 1:
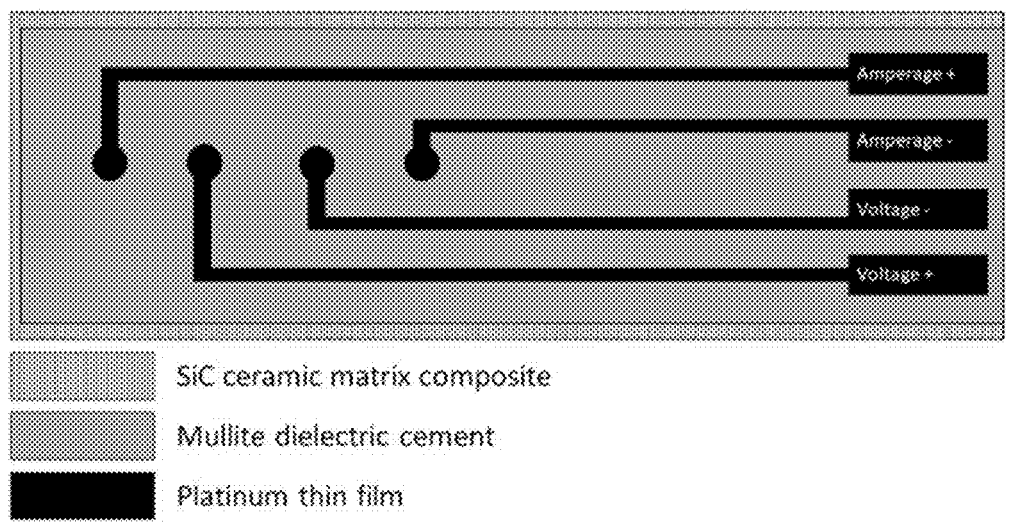
FIG. 1 is a schematic of an RTD sensor utilizing the CMC itself as an active element.

Embodiments of the present invention are RTDs for use on CMCs which use the CMC itself as an active sensor element. In at least one embodiment, a coating or material that insulates and/or planarizes the surface, preferably a dielectric, can be applied to the surface and fired at high temperature. A person of ordinary skill would appreciate the various materials suitable for this application. The coating not only provides electrical isolation but, for thin film applications, also planarizes the CMC surface so it is compatible with thin film processing, since thin film sensors can be deposited directly on the surface of the coated CMC via sputtering. The ability to instrument CMC surfaces preferably utilizes an insulating and/or planarizing dielectric coating, and the adhesion of platinum lead outs to the coatings formed on the SiC—SiC CMC. The platinum or other conductor preferably directly contacts the CMC surface through openings in the coating. A schematic (top view) of this SiC RTD embodiment of this invention on a CMC is shown in FIG. 1.

The present invention's approach for making surface temperature measurements is suited for very high temperature applications because it only requires a single conductive component for connecting wire leads. In at least one embodiment, the conductive component is platinum, although any high melting point metal or other conductor may be used. This makes it possible for the RTDs of the present invention to be used at exceedingly high temperatures, as high as 1600° C., since platinum melts at 1768° C. Further, because this approach only requires a single conductive component, it requires very few fabrication steps. This provides the added benefit of a more streamlined and simplified fabrication sequence. Embodiments of the present invention are well suited for very high temperature applications also because the SiC fibers in the ceramic matrix composite are the primary active sensor elements; these are refractory and extremely stable.

Further, because the CMC is itself used, few processing steps are required. In at least one embodiment utilizing thin film technology, the SiC CMC is partially coated with a mullite cement or other dielectric, and platinum thin films are sputter-deposited on the surface in order to provide a highly conductive path to the SiC fibers in the CMC. The dielectric also planarizes the SiC weave in the CMC substrate, enabling subsequent thin film deposition of metal. In this embodiment only two processing steps (dielectric such as mullite cement coating and sputter deposition) are required, making the fabrication sequence streamlined and simplified. The platinum is preferably a thin film with a thickness of approximately 1.5-2 µm, but any thickness may be used. The dielectric coating can be any thickness, typically a few hundred microns; in at least one embodiment the thickness is approximately 200 µm. Depending on how the dielectric layer is applied to the CMC substrate, for example if it is applied as a cement slurry, light lapping of the surface may be desirable to further planarize it for subsequent platinum deposition.

Alternatively, thick film technology may be used to manufacture the CMC RTD of the present invention. The thickness of the mullite is similar to that above; the thickness of the platinum film can be anything. Some advantages of this approach include the following: (a) a vacuum chamber is not required for fabrication purposes, and thick film technology can be used to make all electrical connections; (b) very large parts that cannot fit into the vacuum chamber of a sputtering machine can be instrumented; (c) lithography steps can be omitted if small line-widths and spaces are not required; (d) inks, pastes, cements or thermal spraying can be used to deposit the metallic legs and dielectric layers; (e) planarization is not required; and (0 damage to the conductive material or the dielectric, insulating, and or planarizing film in such case is preferably reparable by depositing paste, ink, spray, or cement in situ. Platinum lines and dielectric coatings that insulate the surface can be applied using any of these techniques. Similar to the thin film embodiments discussed above, in some thick film technology embodiments only two steps are needed.

Openings in the dielectric layer may be created in any way; for example, the dielectric may be deposited using a mask, or may be etched after deposition. It is preferable that the bond pads are deposited on the dielectric material, which can comprise mullite or any other dielectric or insulating material, since it provides electrical isolation between the platinum or other metal traces and the CMC substrate. Furthermore, when the lead outs are spot welded to the bond pads, the dielectric prevents chemical interdiffusion between the CMC and the platinum. In alternative embodiments, the lead outs are attached to the bond pads using high purity platinum paste. Increased stability at high temperatures is important; most thin film sensors fail due to the small diffusional distances associated with these devices. Thick film devices are also affected by interdiffusion at high temperatures.

As shown in FIG. 1, the device preferably comprises four wires to form a four wire RTD, which can eliminate the effects of contact resistance, particularly as the temperature of the connection is increased.

Figure 2:
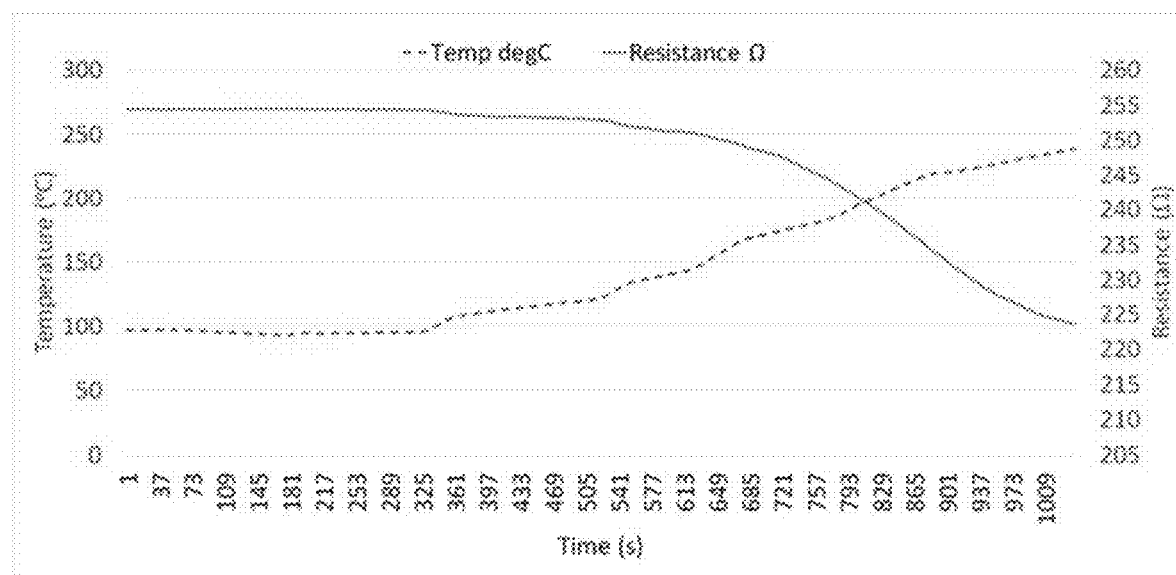
FIG. 2 is a graph showing the dependence of electrical resistance on temperature over a temperature range of 150° C.

One aspect of the present invention relates to a device that can be applied to the surface of a CMC in such a way that the CMC itself will exhibit an extraordinarily large change in electrical resistance depending on the impurity levels in the SiC (CMC). In at least one embodiment, as shown in FIG. 2, the resistance changes from 250Ω to 225Ω when the temperature was changed from 100° C. to 245° C. This change represents a negative temperature coefficient of resistance (TCR), as might be expected using a semiconductor like silicon carbide. Furthermore, SiC, being a wide bandgap semiconductor, has very large TCR which provides a much higher resolution measurement than a metallic RTD, for example a platinum RTD.

According to various embodiments, the use of different orientations of SiC fibers in the CMC will result in smaller or larger changes in resistance, depending on fiber orientation. If, for example, the fiber orientation runs along the length of the CMC, the greatest change of resistance will occur. When the CMC has horizontally oriented fibers, the smallest change will be produced. CMC's with fibers oriented in between will provide responses that are in between those of the horizontal and vertical fiber orientations.

In the example of platinum and a CMC comprising SiC, at high temperatures, the Pt:SiC interface can undergo oxidation; i.e. oxygen can diffuse through the platinum film and oxidize the SiC to form an $SiO_2$ layer. This oxide changes the nature of the ohmic contact associated with the Pt:SiC interface to form a rectifying contact instead; thus, implementing an effective oxygen diffusion barrier improves the high temperature performance of the RTD. The Pt:SiC interface can also undergo platinum-silicide formation at temperatures greater than 600° C. The formation of platinum silicides is normally inhibited by the diffusion of oxygen through the platinum, but when an oxygen diffusion barrier is employed, the thermodynamics shift in favor of the formation of platinum silicides in the absence of oxygen at the Pt:SiC junction. At approximately 1100° C. a mixture of silicides is produced, but no carbides are typically formed since carbon precipitates migrate to the platinum silicide grain boundaries. The formation of platinum silicides can quickly degrade the performance of the device. Thus, a platinum silicide diffusion barrier is preferably utilized in addition to an oxygen diffusion barrier to enable the RTDs of the present invention to operate at temperatures higher than approximately 1000° C.

Figure 3:
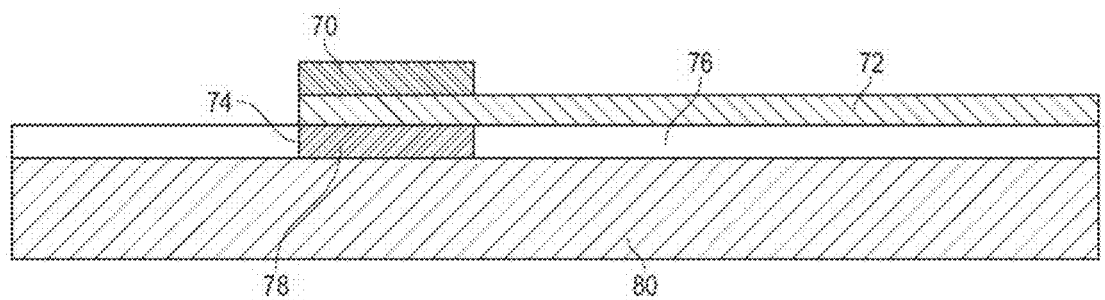
FIG. 3 is a cross-sectional schematic showing an example of the use of diffusion barrier layers with the present invention.

FIG. 3 is a cross-sectional schematic showing an embodiment using diffusion layers with the present invention. Oxygen diffusion barrier 70 covers metal 72 (preferably platinum) in the vicinity of the opening 74 in dielectric (or insulating or planarizing) coating 76. Silicide diffusion barrier 78 is deposited within opening 74 to prevent metal silicide formation which may occur at high temperatures due to interdiffusion of metal and silicon in the CMC where metal 72 contacts CMC 80. Silicide diffusion barrier 78 may or may not have the same thickness as dielectric coating 76. In some embodiments, the oxygen diffusion barrier can be extended to completely cover the top and sides of the metal layer in the vicinity of the opening in the dielectric layer.

In at least one embodiment, in which the metal is platinum and the CMC comprises SiC/SiC, the oxygen diffusion barrier comprises indium oxynitride (InON or InNO) or indium-tin-oxynitride (ITON) and has a thickness of approximately 20 µm, although it may have any thickness. The InON or ITON may be deposited by any method, for example by reactively sputtering $In_2O_3$ in an argon/nitrogen plasma. In some embodiments the silicide diffusion barrier comprises indium tin oxide (ITO), a tungsten:ITO nanocomposite (ITO:W), or an indium tungsten composite (In:W), which can have a film thickness of approximately 20 µm, although it may have any thickness. The ITO or composite can be deposited using any method, for example sputtering. In experiments, the combination of an InON oxygen diffusion barrier and ITO silicide diffusion barrier results in continued operation of thin film devices at over 1000° C. The embodiment in which the barrier coating used to prevent the ingress of platinum silicides is either ITO or ITO:W and the barrier used to prevent oxygen diffusion is InON enables the RTD of the present invention to operate at temperatures above 1200° C. Other materials for diffusion barriers may be used to further increase the maximum operating temperature of the devices.

In alternative embodiments of the present invention, the platinum or other metal may be entirely replaced by another conductive material. It is preferable that the conductive material has a melting, softening, or decomposition temperature at least as high as the melting temperature of platinum. In at least one embodiment thick or thin indium tin oxide (ITO) is used in place of the platinum. The ITO is preferably deposited as a thin film with a thickness of approximately 10-20 µm, but any thickness may be used. In these embodiments, no separate silicide diffusion barrier is required; however, it is still advantageous to deposit an oxygen diffusion barrier, such as InON or ITON, on the conductive ITO to prevent oxygen diffusion through the ITO or reaction with the conductive ITO underneath.

Figure 4:
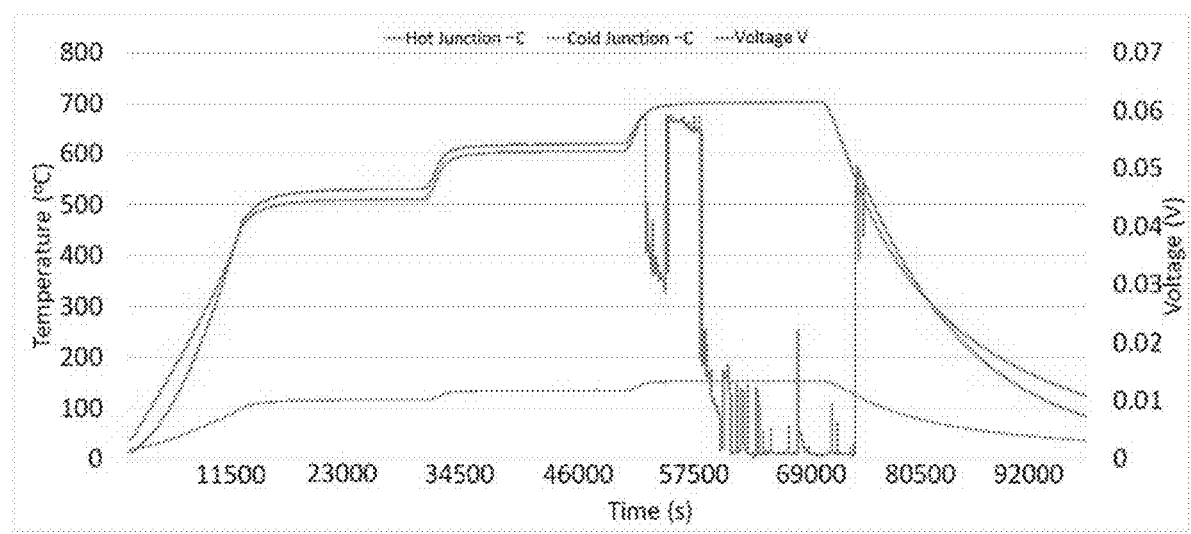
FIG. 4 shows the thermoelectric response of a PT:SiC (CMC) thermocouple without any diffusion barriers.
Figure 5:
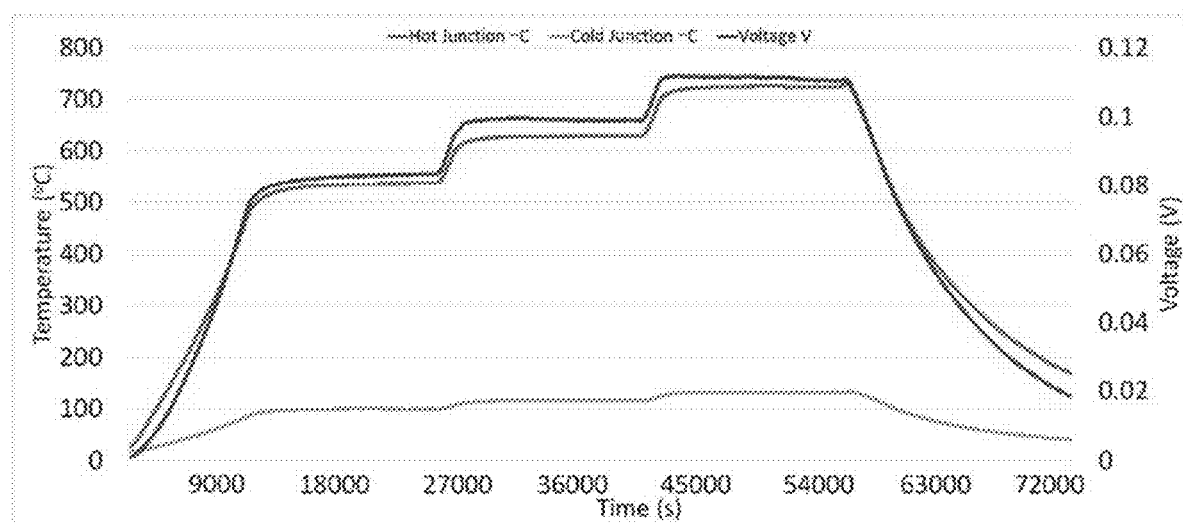
FIG. 5 shows the thermoelectric response of a PT:SiC (CMC) thermocouple with an InON oxygen diffusion barrier but no silicide diffusion barrier.
Figure 6:
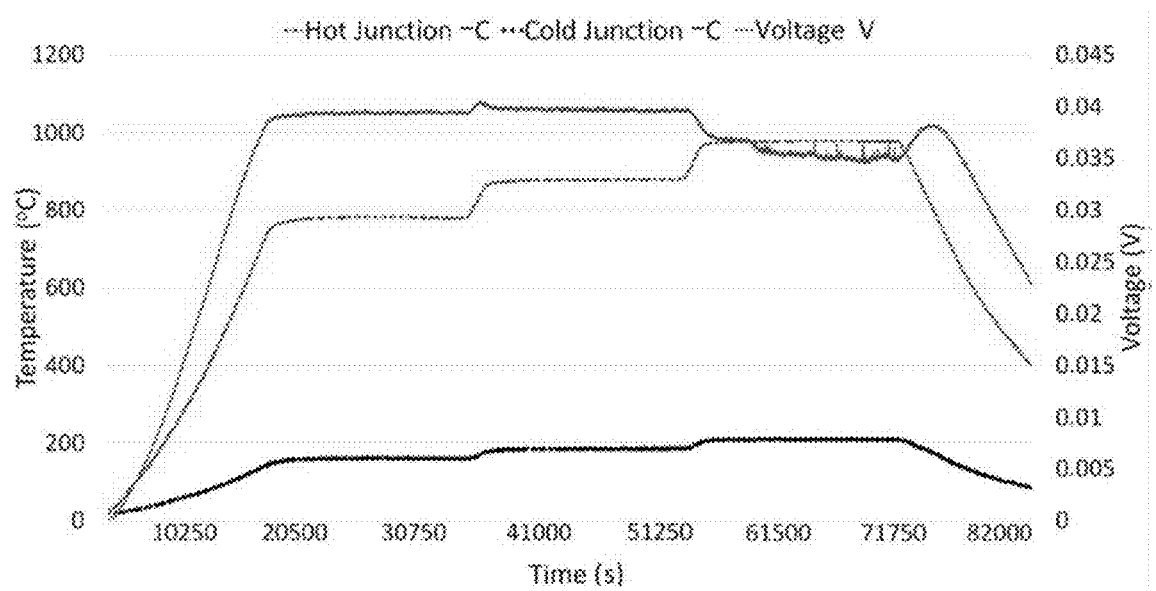
FIG. 6 shows the thermoelectric response of a PT:SiC (CMC) thermocouple with an ITON oxygen diffusion barrier and an ITO platinum silicide diffusion barrier.

The efficacy of oxygen and silicide diffusion barriers is demonstrated in FIGS. 4-6 for thermocouples similar to the RTDs of the present invention. FIG. 4 shows the thermoelectric response of a Pt:SiC(CMC) thermocouple without either diffusion barrier as the temperature is ramped up. This thermocouple was only able to achieve a hot junction temperature of 550° C. before failure. A thermoelectric power of 250 µV/° K was attained for this thermocouple at 550° C. Even at these moderate temperatures, oxygen could readily diffuse through the platinum film forming the junction, reacting with the SiC in the CMC to form $SiO_2$ at the Pt:SiC interface (so that the contact does not remain ohmic), and a drift rate that increased with increasing temperature was observed. The oxidation-induced drift produced a drift rate of 2.68° C./hr at 550° C., but this rate was still low enough that the thermocouple could still function properly. FIG. 5 shows the thermoelectric response of a Pt:SiC CMC thermocouple with an InON oxygen diffusion barrier but with no silicide barrier cycled from 20° C. to 730° C. $In_2O_3$ was reactively sputtered in an argon/nitrogen plasma to form the InON oxygen diffusion barrier coating on the Pt:SiC junctions. This thermocouple achieved a higher hot junction temperature, 720° C., than the thermocouple of FIG. 4. A thermoelectric power of about 190 µV/° K was attained for this thermocouple at 720° C., and a drift rate of 0.31° C./hr was observed at 700° C. The thermocouple could not survive higher temperatures due to the reaction of the platinum in the junction with the SiC in the CMC to form platinum silicides in the absence of oxygen at these elevated temperatures. FIG. 6 shows the thermoelectric response of a Pt:SiC CMC thermocouple with both an ITON oxygen diffusion barrier and an ITO platinum silicide barrier cycled from 20° C. to 1000° C. Stable hot junction temperatures on the order of 950° C. (and even above 1000° C.) were attained with a low drift rate of 0.027° C./hr, which is well within the temperature range of interest for devices of the present invention, and represents a 400° C. improvement in stability over unprotected devices. Drift rates for the thermocouples with an ITON oxygen diffusion barrier were extremely small, indicating that the ITON film performs exceptionally well as a diffusion barrier. Also, resistance measurements were made to confirm that the ohmic nature of the Pt:SiC contact was maintained.

In some embodiments of the present invention, in order to reduce or eliminate the effects of strain of the substrate on temperature measurement, n-type conductive oxide (e.g. ITO, AZO, etc.) legs in series with the SiC—SiC CMC can create a zero or very low gage factor system of resistors. The TCR will remain negative (amplified by the conductive oxide legs) but will not be affected by the rotational forces in the engine. This is made possible by the conductive oxide being n-type and the SiC—SiC CMC being p-type and showing opposite changes in resistance as a function of strain in the same direction.

Some CMC's used in the present invention may have an environmental barrier coating (EBC) applied to protect the parts against, for example, humidity and oxidation. In such cases it is preferable to first deposit a polymer mask on the EBC and etch the EBC, for example by immersing the part in HF to remove the EBC from the surface of the CMC in the desired areas (i.e. those areas where the metal RTD element will form an ohmic contact to the CMC). Then the polymer mask is preferably removed; the part is then re-masked with polymer over the etched portions, and the dielectric or insulating layer is then applied. When the polymer is removed, an opening or via in the dielectric layer as well as the EBC is available to enable the metal to form the ohmic contact with the CMC.

In some embodiments, if the EBC is non-conductive and has an adequate surface roughness (i.e. an adequately smooth surface), then the EBC can be used in place of the mullite as a dielectric material for the RTD legs and bond pads. Alternatively, if the EBC is conductive at high temperatures, it can be used as a silicide diffusion barrier. Silicide barriers will typically be required if the material making contact to the CMC is metallic, since the SiC—SiC CMC will easily react with these in the absence of oxygen at the temperatures experienced in the hot section of a gas turbine engine.

Other Devices

The materials and methods described above, including but not limited to the use of an EBC, are applicable to devices other than the RTDs described above that use the CMC substrate as a sensing element, such as strain gages, thermocouples, surface temperature sensors, and thermal gradient sensors. These devices are disclosed in more detail in U.S. patent application Ser. No. 15/430,828, entitled "Temperature and Thermal Gradient Sensor for Ceramic Matrix Composites and Methods of Preparation Thereof", filed on Feb. 13, 2017; U.S. patent application Ser. No. 15/640,348, entitled "High Resolution Strain Gages for Ceramic Matrix Composites and Methods of Manufacture Thereof", filed on Jun. 30, 2017; U.S. Provisional Patent Application Ser. No. 62/526,277, entitled "Ceramic Matrix Composite Based Thermocouples", filed on Jun. 28, 2017; K. Rivera, T. Muth, J. Rhoat, M. Ricci, O. J. Gregory, "Novel temperature sensors for CMC engine components," Journal of Materials Research, vol. 32, pp. 3319-3325 (Sep. 14, 2017); K. Rivera, M. Ricci, O. J. Gregory, "Embedded thermocouples for CMC engine components," IEEE Sensors 2017, pp. 1-3 (Dec. 25, 2017); K. Rivera, M. Ricci, O. J. Gregory, "Diffusion barrier coatings for CMC thermocouples," Surface &Coatings Technology, vol. 336, pp. 17-21 (Feb. 25, 2018); K. Rivera, M. Ricci, O. J. Gregory, "Advanced Sensors for CMC Engine Components," ICACC 2017 proceedings, vol. 2, pp. 1-4 (May 31, 2018); and K. Rivera, O. J. Gregory, "Strain Gages for SiC—SiC CMC Ceramic Matrix Composite Engine Components," IEEE Sensors Letters, vol. 2, pp. 1-4 (Jul. 10, 2018); all of which are incorporated herein by reference.

Figure 7:
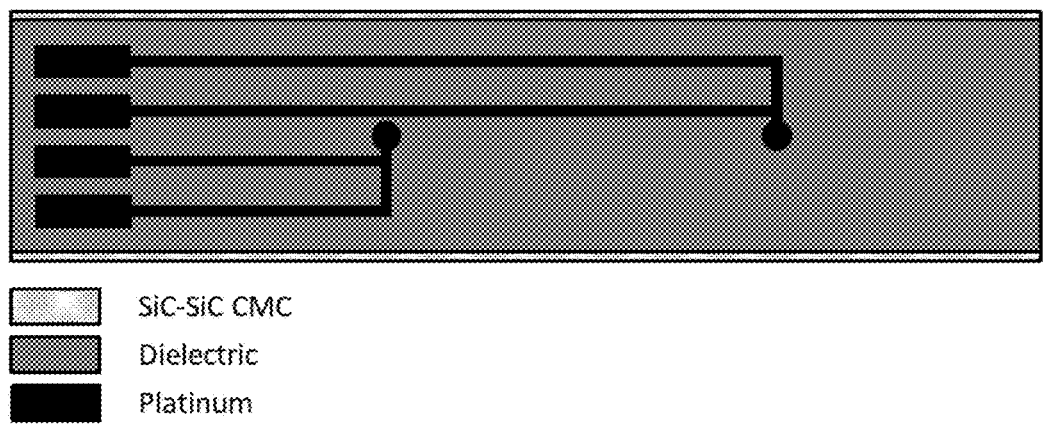
FIG. 7 is a schematic of a different embodiment of an RTD of the present invention that can also be used as a strain gage.

One or more embodiments of the present invention can be used both as an RTD and a strain gage. FIG. 7 is a schematic of a Pt:SiC CMC RTD and strain gage design. Current is passed through the outer pads and the voltage drop is measured across the inner pads. The same pattern can be used as both a Pt:SiC CMC RTD as well as a Pt:SiC CMC strain gage. Since the resistance of the SiC—SiC CMC is much lower than the deposited Pt thin films, a four wire method (measurement) can be used to eliminate the contact resistance of the thin films and insure that the positive TCR of the metal films (legs) does not overwhelm the negative TCR of the SiC—SiC CMC. The advantage is that either device can be made from the same pattern and the fabrication steps are identical, making it possible to make a multitude of strain and temperature measurements using a single process. This provides great flexibility in terms of sensor design, and enables both temperature and strain measurements to be made in the same location. In this embodiment the strain gage is preferably optimized for electrical resistance changes due to mechanical strain only and not apparent strain or thermal strain. To accomplish this, a second strain gage is preferably oriented at 90 degrees relative to the orientation of the gage where the desired strain is to be measured. The opposite of this would be true if an RTD was to be used to measure a temperature; i.e. one would desire the TCR of the SiC to dominate the changes.

Example 1

ITO and Pt/Rh based RTD devices according to the present invention were manufactured and tested. SiC—SiC CMC substrates were heated to 1000° C. for 15 hours to grow a stable oxide layer to improve adhesion of the dielectric coatings. A 20 μm mullite coating was then applied to the surface and heat treated at 100° C. and 200° C. for 20 minutes, 300° C. for 40 minutes on a hot plate and slowly ramped to 1000° C. for 15 hours in a tube furnace. Photolithography techniques were then used to pattern the substrate with the RTD pattern. The resist coated substrate was then placed in a sputtering chamber at 9 mTorr with argon gas and sputtered with either Pt/Rh or indium tin oxide (ITO). High purity Pt/Rh was RF sputter-deposited for 2.5 hours at 300W and a forward voltage of 1000V. ITO was RF sputter-deposited for 10 hours at 350W and a forward voltage of 1100V. The resistance of the SiC—SiC CMC is much lower than the deposited Pt/Rh thin films and a four point resistance measurement design, as shown in FIG. 7, was used to eliminate the contact resistance of the thin films and to ensure that the positive TCR of the metal thin films would not overpower the negative TCR of the SiC—SiC CMC. In this configuration current is passed through the outer legs and the voltage drop is measured across the inner legs. The ITO:SiC and Pt/Rh:SiC contacts were susceptible to oxygen diffusion and subsequent oxidation of the ITO at high temperatures. Once oxygen diffuses through the contact it can oxidize the SiC in the CMC and form a $SiO_2$ layer that causes the contact to become rectifying and eventually electrically insulating. Reactively sputtered coatings consisting of ITON (10 um) were used to protect these contact areas.

When Pt or Pt/Rh thin films were used, a four wire resistivity measurement was used as opposed to a 2-point measurement to eliminate contact resistance and avoid the changes in resistance contributed by the thin leads since they exhibit positive TCR. When conductive oxide thin films were used, a four-wire resistivity measurement was used but only two contact points were used since TCR of the conductive oxides is negative similar to the SiC in the CMC. In the four wire measurement, electrical current was passed along the outer leads and the voltage drop across the SiC—SiC CMC was measured at the inner leads.

Figure 8:
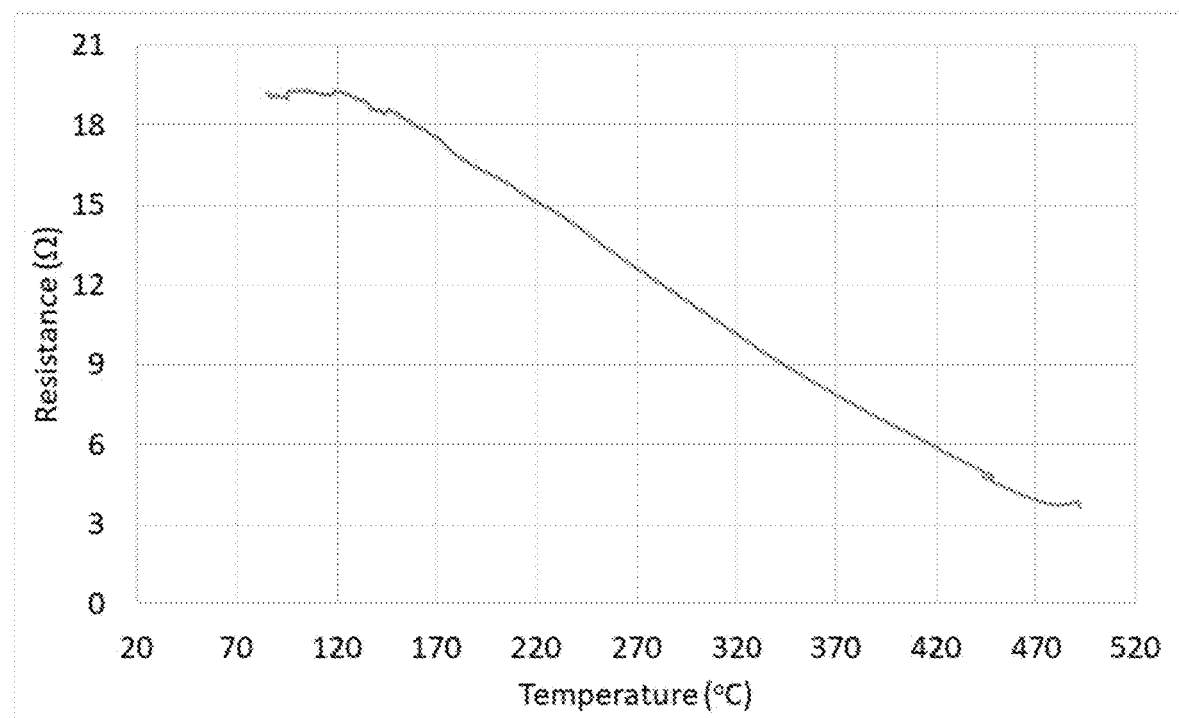
FIG. 8 shows electrical resistance as a function of temperature for a Pt/Rh:SiC CMC RTD of Example 1.
Figure 9:
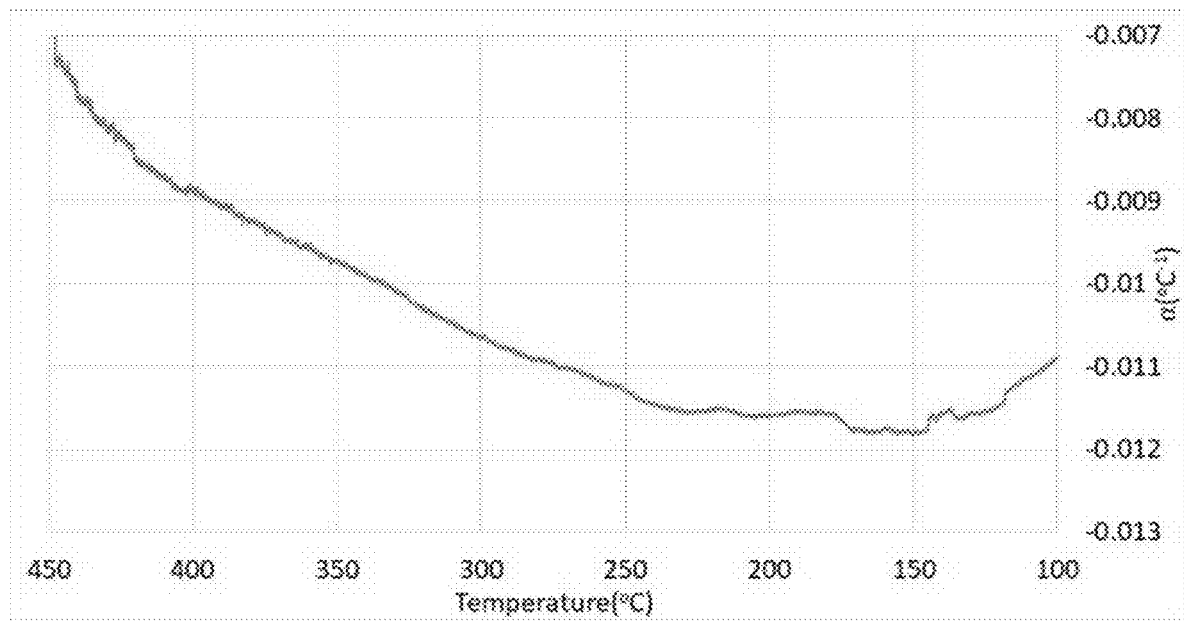
FIG. 9 shows the TCR of the RTD of FIG. 8 as a function of temperature.
Figure 10:
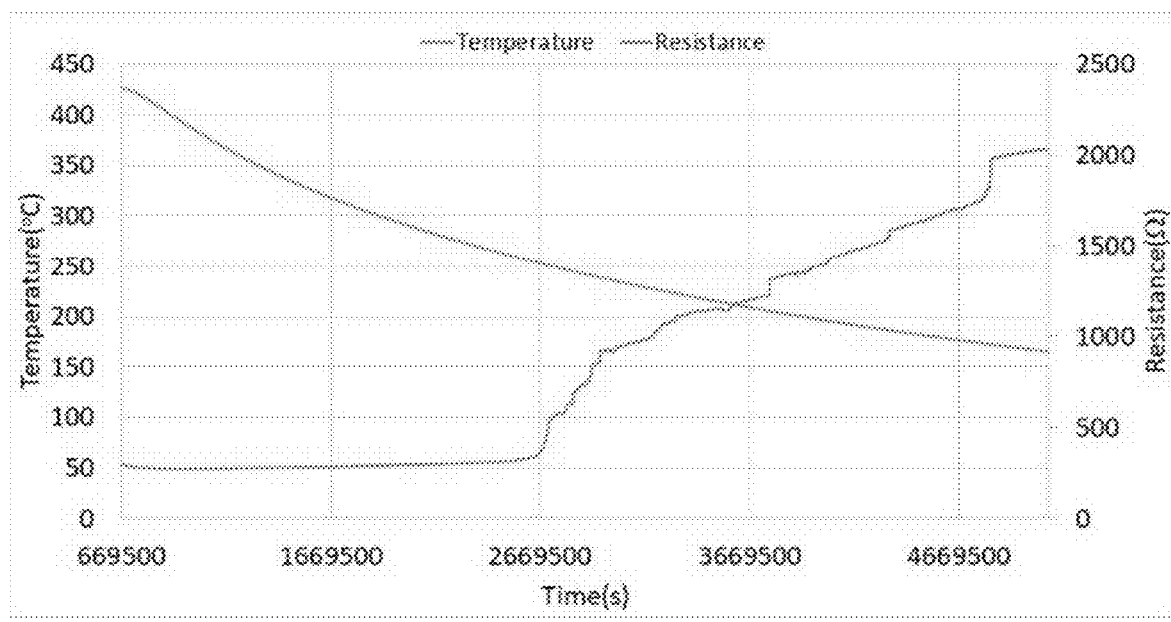
FIG. 10 shows ramp down of an ITON/ITO:SiC CMC RTD of Example 1. The contribution of the ITO film was observed from 425° C.-250° C.
Figure 11:
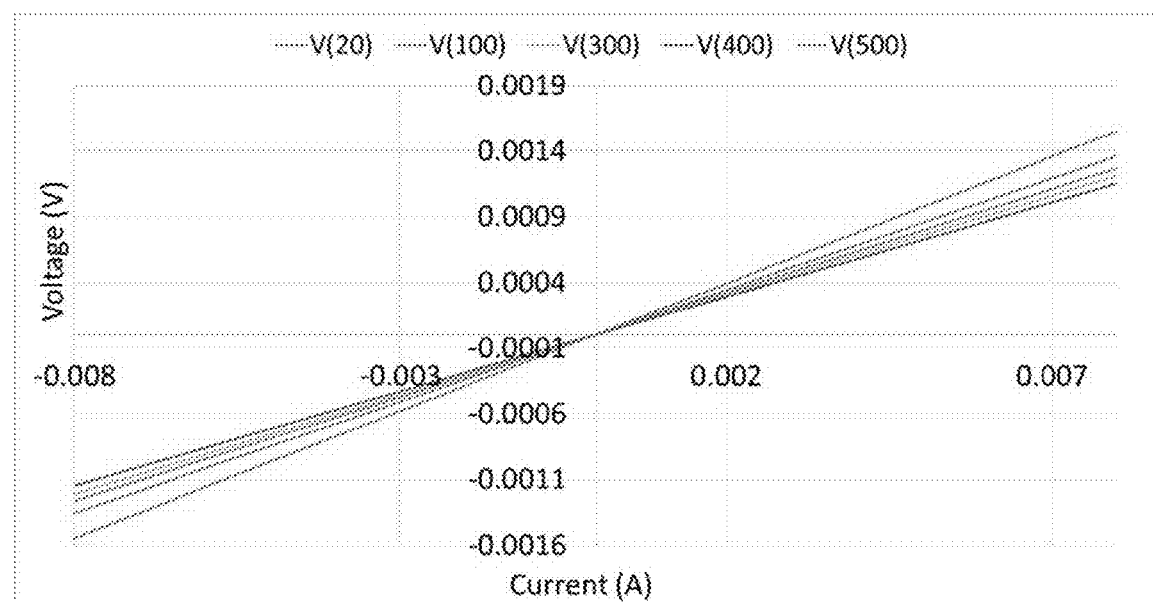
FIG. 11 shows IV characteristics of an ITO:SiC CMC contact of Example 1 as a function of temperature using the Van der Pauw method. ITO forms an ohmic contact to the SiC—SiC CMC.

The Pt/Rh:SiC CMC RTD was thermally excited to 500° C. and then cooled to 100° C. The RTD started off with a very low resistance due to the four point design used, which eliminated the resistance of the Pt/Rh legs. The electrical resistance as a function of temperature is shown in FIG. 8. A linear relationship between electrical resistance and temperature exists from 150° C. to 450° C. and nonlinear behavior was observed at temperatures lower than 150° C. and higher than 450° C. The low starting resistance (about 200) made temperature measurement above 500° C. difficult for the data acquisition because the change in resistance per unit change in temperature was minimized as the resistance decreased. The TCR of the Pt/Rh:SiC CMC RTD, shown in FIG. 9, was due to the SiC—SiC CMC. The ITO:SiC CMC RTDs did not perform as well mainly due to a large temperature range over which the resistance remains near 500 (425-250° C.). The resistance change from 250-150° C. was more dramatic but contained much more noise compared to the Pt/Rh:SiC CMC RTD, as shown in FIG. 10. The IV characteristics of the ITO:SiC contacts were evaluated using the Van der Pauw method and it was determined that they formed an ohmic contact, as shown in FIG. 11. Thus the Pt/Rh:SiC CMC RTDs were more stable in terms of performance compared to the ITO:SiC CMC RTDs.

Example 2

Figure 12:
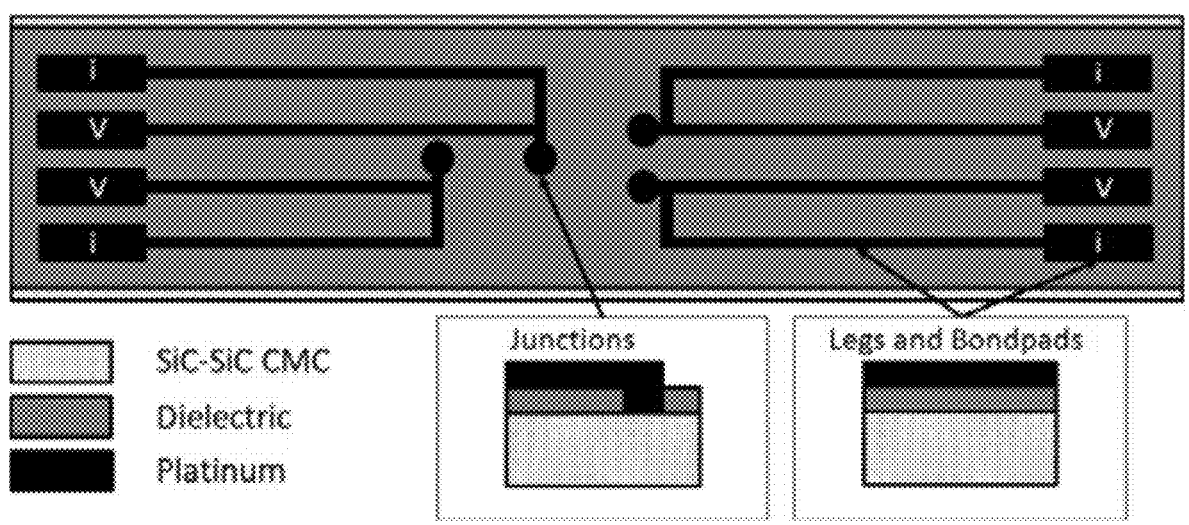
FIG. 12 shows a Pt:SiC CMC strain gage design with two outer leads (current) and two inner leads (voltage) as described in Example 2. The pattern on the left is sensitive to longitudinal strain and the pattern on the right is sensitive to transverse strain.

Strain gages which use the SiC—SiC CMC as the active strain element were manufactured and tested. As-received SiC—SiC CMCs (19 cm×2.5 cm×0.3 cm) were heated in an MHI tube furnace at 1000° C. for 20 hours to clean them and grow a stable oxide. A 20 μm thick layer of mullite dielectric was applied using a doctor blade technique to create a smooth surface and heat treated to 100° C., 200° C., 300° C. for 30 minutes each, and a final heat treatment at 1000° C. for 15 hours using a Deltech tube furnace. Photolithography techniques were employed using a dry photoresist (Dupont MX5050) to which the strain gage pattern was applied over the dielectric as shown in FIG. 12. Via holes were created in the dielectric where the SiC—SiC CMC makes contact to the thin film leads, and the surface of the SiC—SiC CMC in these areas was etched using a buffered hydrofluoric acid solution comprising 15% HF and 85% ammonium fluoride (NH₄F). By using this solution to remove the native SiO$_2$ from the surface of the SiC—SiC CMC, as opposed to a physical method such as abrasion, the oxide is more uniformly and completely removed, thus providing an improved interfacial contact surface with the thin film leads (or more typically diffusion barriers). High purity platinum was then RF sputtered directly into the windows created in the photoresist for 1 hour at 300W and a forward voltage of 1200V in 9 mTorr high purity argon gas. The platinum films, 2.5 µm thick, were then annealed in nitrogen to remove any trapped argon and point defects formed during the sputter process. The Pt:siC CMC contacts were tested via the Van der Pauw technique and determined to be ohmic up to about 550° C., above which temperature their I-V behavior was rectifying, indicating formation of a Schottky barrier.

Two techniques were used to apply strain to the Pt:SiC CMC strain gages. One was a four-point bend method described by ASTM C1341 to ensure uniform strain across the surface and the other was a cantilever loading method, which allowed the strain gage to be tested at elevated temperatures. The four-point method testing setup used an Instron tensile testing machine to load the beam and therefore, was only used for room temperature piezoresistance measurements. The cantilever-load method was used for high-temperature piezoresistance measurements, since the fixture was able to fit within the hot zone of a tube furnace. Two lag screws were used to keep the Pt:SiC CMC strain gage in place and the strain gage was excited using a rigid alumina rod that was oscillated by a small rotating steel cylinder mounted on a high torque DC motor. A two wire Kelvin clamp method was used to measure strain performance at lower temperatures and a 4-wire method was utilized for higher temperature testing to eliminate contact resistance. The Pt:SiC CMC strain gages were excited using 10 mA (Keithly 224 constant current source), and were connected to a PDaq54 to measure voltage drop across the strain gage. A student strain gage was mounted at the center of the strain gage on the surface using an epoxy in order to measure applied strain during testing and interfaced with a Vishay P3 strain indicator to collect strain data.

The two main factors that affect overall resistance change during strain are a geometric effect as well as changes in resistivity of the active strain element. The following equation shows this relationship for strain gages:

$$GF = 1 + 2v + \frac{\Delta \rho}{\rho_o \varepsilon}$$

where $\Delta \rho$ is the change in resistivity, $\rho_o$ is the initial resistivity at room temperature, $\varepsilon$ is the applied strain, and $v$ is the poisson ratio. The first two terms are due to a geometric effect and the last term is due to piezoresistivity, which for semiconductors is the dominant term. Gage factor was calculated using:

$$GF = \frac{\Delta R}{R_o \varepsilon}$$

where $\Delta R$ is the change of resistance and $R_o$ is the initial resistance at room temperature. To determine the strain gage output drift over a prolonged period at a constant applied strain rate and constant temperature for the Pt:SiC CMC strain gage the following equation was used:

$$\varepsilon_d = \frac{\Delta R}{R_i} \cdot \frac{\varepsilon_c}{\Delta t}$$

where $\Delta R$ is the change in resistance, $R_i$ is the initial resistance at the start of the hold period, $\varepsilon_c$ is the constant applied strain rate, and $\Delta t$ is the elapsed hold time.

Figure 13A:
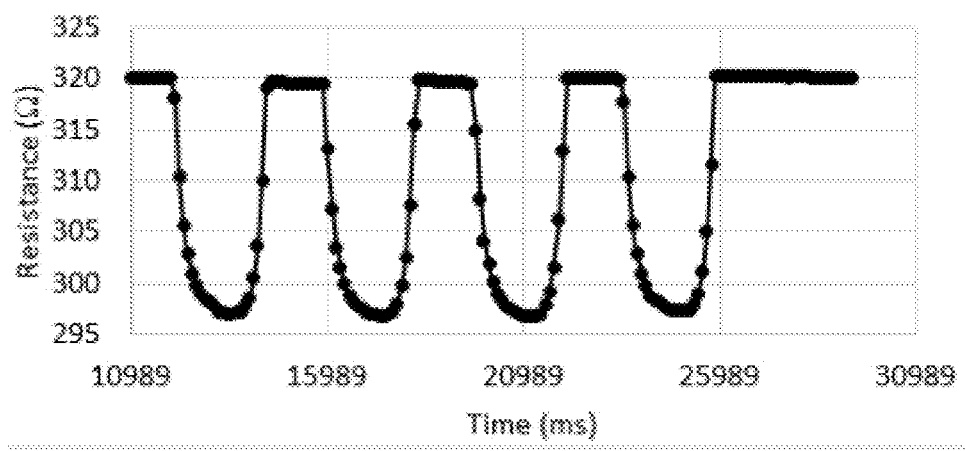
FIG. 13A shows a portion of results from a test for a Pt:SiC CMC strain gage strained at $-600\mu\varepsilon$ and 20° C.; a gage factor of 112 is achieved.
Figure 13B:
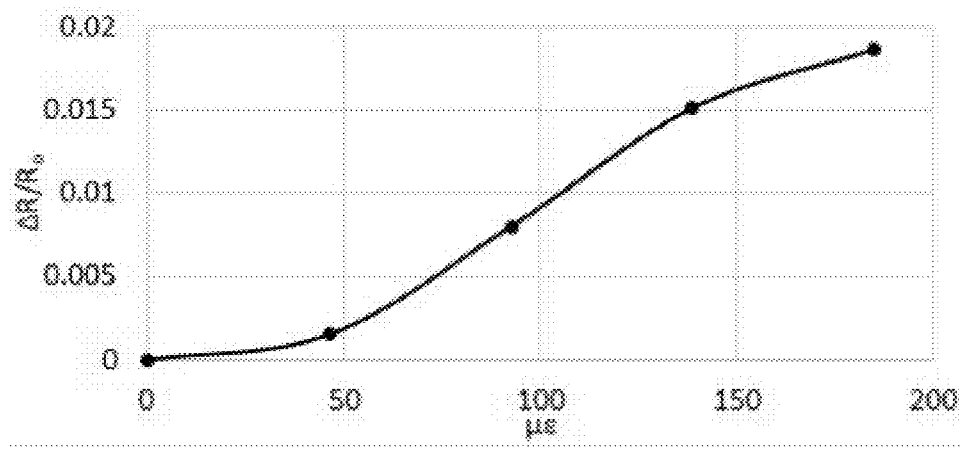
FIG. 13B shows a plot (bottom) showing resistance change as a function of applied strain in tension of the strain gage of FIG. 12; note the slight non-linear resistance change with applied strain.
Figure 14:
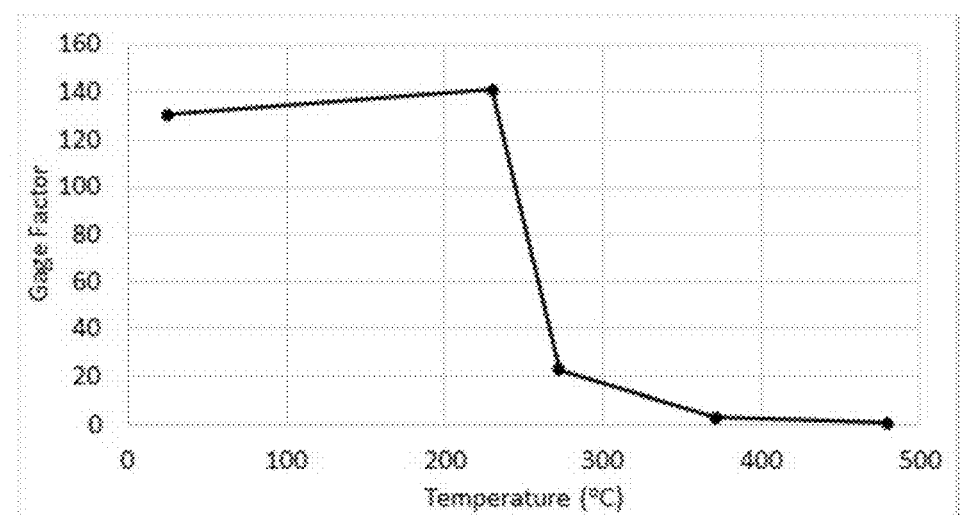
FIG. 14 shows the effect of temperature on the gage factor for the Pt:SiC CMC strain gage of FIG. 12 under compressive strain.

The cantilever-load method was used to determine gage factor at elevated temperatures. Here, a continuous excitation current of 10 mA was used to excite the strain gage. When the Pt:SiC CMC strain gage was tested under −600µε of compression, a gage factor of 112 was measured, shown in FIGS. 13A-13B. This gage factor value was repeatable and reproducible at room temperature over a large number of similarly oriented CMC substrates. Under 300µε of tension the gage factor was 50. Transverse gage factors were also determined using the same method and they were equal and opposite to the longitudinal gage factors in both tension and compression. These gage factors are large compared with those reported for SiC in literature, probably because it is likely that the SiC fibers in the CMC carry a majority of the current and that the grains are highly crystalline and oriented in the direction of drawing with a high degree of anisotropy, which should result in large gage factors. The SiC matrix is also potentially contributing to the bulk piezoresistive properties but these have not been documented to date so their role is not certain. In general, the gage factor was nonlinear as strain was applied but had a region within 50-125µε where the gage factor was relatively linear, as shown in FIGS. 13A-13B. From 20-230° C. the gage factor increased but at temperatures beyond, the gage factor diminished to about 1, as shown in FIG. 14. The Pt:SiC CMC strain gages exhibited large changes in resistance when strained but did not fully return to their original resistance, due to damage accumulation in the SiC fibers. Through non-destructive evaluation it has been shown that the majority of current in the SiC CMCs is carried by the fibers, and any damage will show up as a resistance change. At 500° C., the drift rates in compression and TCR were −0.0492µε/hr and −0.0006435° C.$^{-1}$ respectively.

Figure 15:
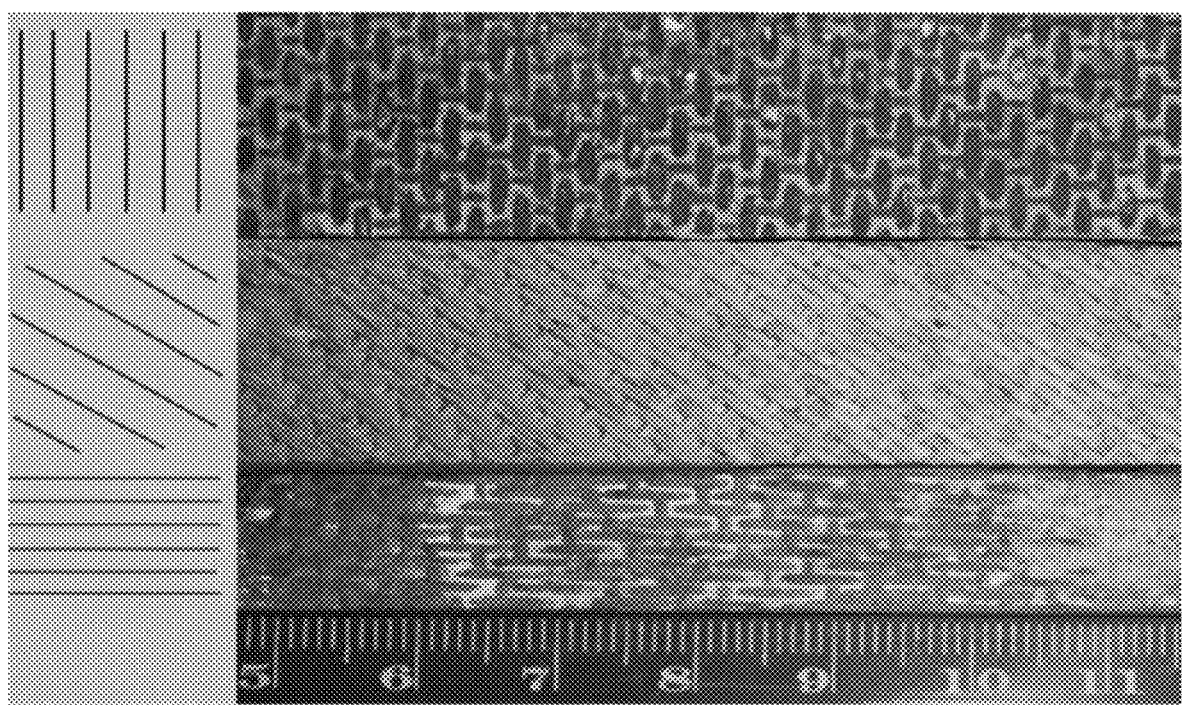
FIG. 15 is a photograph of SiC—SiC CMC substrates with differing fiber orientations. Relative to the long axis, the fiber orientation of the top sample is at 90°, the fiber orientation of the middle sample is 45°, and the fiber orientation of the bottom sample is parallel (0°).

The SiC—SiC CMC substrates comprised polycrystalline SiC fibers encased within a polycrystalline SiC matrix. The SiC fibers were oriented in different directions within the matrix for different substrates, as shown in FIG. 15. and in previous work, thermocouples in which the SiC—SiC CMC was an active thermoelement saw a noticeable effect on overall thermoelectric performance based on the orientation of the SiC embedded fibers. Gage factors for Pt:SiC CMC strain gages fabricated on SiC—SiC CMC substrates with different fiber orientations at room temperature are shown in Table 1.

TABLE 1

| Fiber orientation | $\Delta R/R_o$ | µε | Gage factor |
|---|---|---|---|
| Parallel* | −0.008692 | −667 | 13.03 |
| 45°* | −0.023 | −1172 | 19.62 |
| 90°* | −0.028 | −1004 | 27.89 |
| Parallel** | −0.003938 | −140 | 28.13 |
| 45°** | −0.003701 | −197 | 18.79 |
| 90°** | −0.002264 | −275 | 8.23 |

*ASTM C1341 method.
**Cantilever load method.

The ASTM C1341 method was used because the strain could be applied uniformly across the surface but this method resulted in lower gage factors then those measured using the cantilever load method at similar applied strain. An excitation current of 10 mA was used for this method and the strain was applied relative to the long axis of the beam; i.e. for the ASTM C1341 method when the strain gage was fabricated on a beam with fibers parallel to the long axis, a gage factor of 13 was measured, whereas the beam with a 45° fiber orientation had a gage factor of 20. The beam with a 90° fiber orientation had a gage factor of 28. The opposite trend was observed when the Pt:SiC CMC strain gages were tested using the cantilever load method. In the latter case, the largest gage factors were achieved when the SiC fibers were parallel to the long axis of the beam and smaller gage factors were observed when the fibers were oriented at 90° to the long axis of the beam. These results were anticipated when the cantilever load method was utilized. When the CMC beams with the SiC fibers oriented at 90° with respect to the long axis of the beam were tested, the smallest gage factors were recorded; i.e. this orientation was least sensitive to applied strain. The opposite trend was observed when the ASTM C1341 method was used since the direction of applied strain was normal to the directions associated with the cantilever method. Overall, the effect of fiber directionality could be seen but it was not nearly as dramatic as the effect seen with thermoelectric performance of CMC-based thermocouples.

Note that in the specification and claims, "about" or "approximately" means within twenty percent (20%) of the numerical amount cited. As used herein, the singular forms "a," "an," and "the" include plural referents unless the context clearly dictates otherwise. Thus, for example, reference to "a functional group" refers to one or more functional groups, and reference to "the method" includes reference to equivalent steps and methods that would be understood and appreciated by those skilled in the art, and so forth.

Although the invention has been described in detail with particular reference to the disclosed embodiments, other embodiments can achieve the same results. Variations and modifications of the present invention will be obvious to those skilled in the art and it is intended to cover all such modifications and equivalents. The entire disclosures of all patents and publications cited above are hereby incorporated by reference.

What is claimed is:

1. A resistance temperature detector (RTD) comprising an active temperature sensing element comprising a ceramic matrix composite (CMC) substrate and a conductive material;
    wherein a portion of said conductive material is deposited on a layer selected from the group consisting of a dielectric layer, an insulating layer, a planarizing layer, and an environmental barrier coating (EBC), said layer disposed on said CMC substrate; and
    wherein said conductive material electrically contacts said CMC substrate through openings in said layer.

2. The RTD of claim 1 comprising only materials capable of withstanding temperatures greater than 1000° C.

3. The RTD of claim 2 comprising only materials capable of withstanding at temperatures greater than 1600° C.

4. The RTD of claim 1 wherein said conductive material comprises indium tin oxide or a single elemental metal.

5. The RTD of claim 4 wherein said single elemental metal is platinum.

6. The RTD of claim 1 wherein said layer comprises mullite.

7. The RTD of claim 1 wherein a surface of the CMC substrate in the openings is etched using a buffered hydrofluoric acid solution.

8. The RTD of claim 1 comprising an oxygen diffusion barrier deposited on said conductive material in a vicinity of said openings.

9. The RTD of claim 8 wherein said oxygen diffusion barrier comprises indium oxynitride or indium-tin-oxynitride.

10. The RTD of claim 1 comprising a silicide diffusion barrier between said conductive material and said CMC substrate.

11. The RTD of claim 10 wherein said silicide diffusion barrier comprises indium tin oxide, a tungsten:indium tin oxide (tungsten:ITO) nanocomposite, or an indium tungsten composite.

12. The RTD of claim 1 wherein said conductive material and/or said layer is deposited as a paste, ink, spray, or cement.

13. The RTD of claim 12 wherein said conductive material and/or said layer is deposited without the use of a vacuum chamber.

14. The RTD of claim 12 wherein damage to said conductive material and/or said layer is reparable by depositing paste, ink, spray, or cement in situ.

15. The RTD of claim 1 wherein said conductive material and/or said layer is deposited and patterned using vacuum sputtering and/or photolithography.

16. The RTD of claim 1 wherein said CMC substrate comprises a silicon carbide fiber-reinforced silicon carbide matrix, a carbon fiber-reinforced carbon matrix, or a boron nitride fiber-reinforced boron nitride matrix.

17. The RTD of claim 1 comprising a four wire configuration.

18. The RTD of claim 1 wherein the CMC substrate is an engine component.

19. The RTD of claim 1 wherein a magnitude of thermoelectric power produced by the RTD depends on a fiber orientation of the CMC substrate.

20. The RTD of claim 19 wherein an orientation of the RTD relative to the fiber orientation is chosen to maximize the thermoelectric power.

21. The RTD of claim 1 comprising one or more legs in series with the CMC substrate, said legs comprising a conductive oxide.

22. The RTD of claim 21 wherein a semiconductor type of said conductive oxide is opposite a semiconductor type of said CMC substrate.

23. The RTD of claim 1 configured to measure both temperature and strain of the CMC substrate.

24. The RTD of claim 23 comprising a separate strain gage oriented at 90° relative to an orientation of the strain sensing elements of said RTD.

25. A sensing device comprising an active sensing element comprising a ceramic matrix composite (CMC) substrate, the device comprising an environmental barrier coating (EBC) disposed on the CMC substrate; and
    a conductive material;
    wherein the EBC comprises openings through which said conductive material electrically contacts the CMC substrate.

26. The sensing device of claim 25 comprising a strain gage, a thermocouple, a surface temperature sensor, a thermal gradient sensor, an RTD, or a combination thereof.

27. The sensing device of claim 25 wherein said openings are produced by masking and etching the EBC.

28. The sensing device of claim 25 wherein areas of the EBC electrically insulate the CMC substrate from said conductive material.

29. The sensing device of claim 25 wherein the EBC is conductive and areas of the EBC form a silicide diffusion barrier between said conductive material and the CMC substrate.

\* \* \* \* \*